Patented Feb. 21, 1933

1,898,247

UNITED STATES PATENT OFFICE

LEONARD P. DOVE, OF MINOT, NORTH DAKOTA, ASSIGNOR, BY MESNE ASSIGNMENTS, TO R. M. STEE, OF MINOT, NORTH DAKOTA, TRUSTEE

DYE AND PROCESS OF MAKING SAME FROM CARBONACEOUS MATERIAL

No Drawing. Application filed February 11, 1929. Serial No. 339,281.

This invention relates to the production of a new spirit or oil soluble dye or color from ulmic (humic) material.

Heretofore ulmic (humic) matter has been rendered soluble in water by treatment with an alkaline solution, and used extensively for coloring or staining wood or other cellulosic materials like paper.

For certain purposes, where water as a solvent is not desirable, an ulmic (humic) dye or soluble color that is soluble in mediums or vehicles other than water would find very extensive applications in the arts.

Notable among these uses is the production of non-aqueous stains for wood, thus eliminating the expense and trouble due to "grain raising" or "fuzzing" due to the water present in the stain solution.

In a similar manner water in any considerable amount prohibits the use of these ulmic (humic) dyes as a color for varnishes, shellacs, pyroxylin lacquers or varnishes, shoe polishes, printing inks and other useful materials.

This invention relates to the preparation of a dye in solution, paste or dry form that disperses, dissolves or remains suspended in solvents free or virtually free from water.

Since solvents commonly used in the arts that are free from water are so far as known organic (derivatives of carbon) the term "organic" in the chemical sense is here used to designate the solvents Having called attention to a few of the many useful applications of a non-aqueous ulmic (humic) dye or color I will now disclose the method of preparation of this dye.

Carbonaceous material such as peat, lignite, coal or carbonaceous earth is selected usually with reference to the highest soluble content when treated according to the following method.

The carbonaceous earth material is preferably dried at a temperature below that which chars or cokes, that is below a temperature of 150° C. and preferably ground in a suitable mill to a fineness of from 10 mesh to 300 mesh to hasten solution, although grinding is not necessary. From 100 lbs. to 300 lbs. of this more or less dehydrated carbonaceous earth material is placed in a suitable container such as a wooden vat, barrel or metal tank, and from 1 lb. to 25 lbs. of acid, preferably a nearly anhydrous acid such as concentrated sulphuric acid is now added to the carbonaceous material and stirred or mixed intimately with it.

A mild reaction results usually generating heat. After an interval of a few minutes or longer a suitable organic solvent is added to the acidified carbonaceous material and stirred or agitated by suitable means. The amount of organic solvent to be added is controlled by the soluble content of the acidified mixture and the concentration of dye or color desired in the solution. For the foregoing quantity of acid and carbonaceous material from 500 lbs. to 2000 lbs. of organic solvent such as ethylene-glycol-mono-ethyl-ether is usually sufficient to dissolve out the color generated or freed by the acid. More or less complete solution of the color in the solvent is usually accomplished in from 10 minutes to 24 hours depending on agitation, fineness of grinding, temperature. Warming or heating hastens the action of the solvents.

Further preparation of the dye or color is accomplished by settling, decanting the dye solution or centrifuging to remove the inert or insoluble portions of the mixture.

The dye solution is now ready for use or may be further thinned or diluted with compatible thinners such as the alcohols, benzol or other common organic solvents. For certain purposes this solution of dye or color may be further concentrated to a thick syrup, paste or dry condition by evaporation of the solvent.

The specific application of this invention is not limited to the exact percentage of carbonaceous material, mentioned above, kind or amount of acid nor the kind or amount of solvent nor to the order of adding the ingredients. Under certain conditions it is best to add the acid to the solvent then mix the carbonaceous matter with the acidified solvent in any convenient manner. The percentage of water that may be present is not critical except in determining the use of the dye, and more or less water may be residual in the carbonaceous material or in the solvents or water may be added if the usefulness of the dye is not destroyed thereby.

For solvents, any one of a large number may be employed and the following, although appearing in the order of preference, are listed merely as illustrative:

1. Ethylene-glycol-mono-ethyl-ether
2. Ethylene-glycol-mono-butyl-ether
3. Ethylene-glycol-mono-amyl-ether
4. Ethylene-glycol-mono-propyl-ether
5. Diethylene-glycol-mono-methyl-ether
6. Diethylene-glycol-mono-ethyl-ether
7. Ethylene-glycol-mono-methyl-ether
8. Diethylene-glycol-mono-butyl-ether
9. Diethylene-glycol-mono-amyl-ether
10. Diethylene-glycol-mono-propyl-ether
11. Benzol or benzene
12. Ethyl alcohol
13. Methyl alcohol.

Having thus described my invention, what I claim as new and desire to secure by Letters Patent is:

1. The process of producing a dye which comprises subjecting humic material to the action of one of the common commercial concentrated mineral acids and an alkyl ether of the ethylene glycols.

2. A dye comprising humic material, one of the common commercial concentrated mineral acids and an alkyl ether of the ethylene glycols.

3. The process of producing a dye which comprises subjecting humic material to the action of concentrated sulphuric acid and an alkyl ether of the ethylene glycols.

4. A dye comprising humic material, concentrated sulphuric acid and an alkyl ether of the ethylene glycols.

5. The process of producing a dye which comprises subjecting humic material to the action of a dispersing agent consisting of a strong commercial mineral acid and an alkyl ether of the ethylene glycols, and mixing with a non-aqueous thinner in which the humic material is insoluble, but in which such humic material is dispersed when combined with the dispersing agent.

LEONARD P. DOVE